United States Patent [19]
Addison

[11] Patent Number: 6,098,472
[45] Date of Patent: Aug. 8, 2000

[54] DEVICE AND METHOD FOR INSPECTION OF ELECTRICAL LAMINATIONS

[75] Inventor: Steven W. Addison, Athens, Ga.

[73] Assignee: Reliance Electric Technologies, LLC, Thousand Oaks, Calif.

[21] Appl. No.: 08/802,151

[22] Filed: Feb. 19, 1997

[51] Int. Cl.[7] .................................................. G01M 19/00
[52] U.S. Cl. .......................... 73/865.8; 73/865.9; 33/548; 33/549
[58] Field of Search ............................... 73/865.8, 865.9, 73/162; 33/501.7, 501.11, 501.12, 501.19, 501.2, 501.14, 501.15, 501.17, 501.18, 548, 549, 567

[56] References Cited

U.S. PATENT DOCUMENTS

| | | | |
|---|---|---|---|
| 3,507,049 | 4/1970 | Heldt et al. ................................ | 73/162 |
| 4,079,512 | 3/1978 | Lakes ......................................... | 29/732 |
| 4,870,358 | 9/1989 | Glaize et al. ............................. | 324/208 |
| 5,550,629 | 8/1996 | Shapanus et al. ......................... | 356/72 |
| 5,777,730 | 7/1998 | Dunlap ...................................... | 356/237 |

*Primary Examiner*—Thomas P. Noland
*Attorney, Agent, or Firm*—Craig N. Killen; John J. Horn; William R. Walbrun

[57] ABSTRACT

A device and method are disclosed for inspecting core laminations of an electrical machine, such as an AC induction motor. The core laminations define inner diameter and outer diameter slots preferably in a predetermined orientation with respect to one another. The inspection device of the invention includes a bed plate defining at least one key channel to align with the inner and outer diameter slots in the predetermined orientation. A first key is slidable in the key channel to engage an inner diameter slot. An outer diameter slot is engaged by a second key if the predetermined orientation has been achieved. If the predetermined orientation has not been achieved, the second key will not engage the outer diameter slot. A plurality of post members may be inserted into registered slots provided in a stack of core laminations to facilitate visual inspection of several attributes.

10 Claims, 6 Drawing Sheets

DEVICE AND METHOD FOR INSPECTION OF ELECTRICAL LAMINATIONS

BACKGROUND OF THE INVENTION

The present invention relates generally to the manufacture of electrical machines, such as electric motors or generators. More particularly, the present invention relates to a device and method for inspecting core laminations of an electrical machine.

Electrical machines produced according to mass production techniques will often utilize a plurality of core laminations which have been stacked and welded together. For example, both the stator and rotor of AC induction motors are typically produced in this manner. The individual laminations are frequently produced from larger sheets by industrial punch presses. In the case of stator laminations, the punch press will often form a series of slots about the lamination's inner diameter. After a plurality of these laminations are stacked and welded, the slots are stuffed with wire bundles through which the driving current will flow.

Typically, the stator laminations further include various timing slots about their outer diameter. For various reasons, the timing slots are often formed in the lamination prior to the stage in which the inner diameter slots are produced. For manufacturing consistency, however, it is desirable that a predetermined orientation be maintained between the wireway slots on the lamination's inner diameter and the outer diameter timing slots. It is also desirable that this predetermined orientation be maintained from one lamination to the next.

The predetermined orientation between the wireway slots and the timing slots is ideally fixed when the punch press is set up. In the past, however, it has generally been necessary to adjust the punch press by relatively crude trial and error techniques. In other words, sample laminations are produced and then inspected for conformance with final specifications. If the predetermined orientation has not been achieved, the punch press is adjusted based on the skill of the operator in an effort to reduce such error. Subsequent adjustments are made iteratively as additional laminations are produced until the predetermined orientation has been achieved.

SUMMARY OF THE INVENTION

The present invention recognizes and addresses the foregoing disadvantages, and others, of prior art constructions and methods. Accordingly, it is an object of the present invention to provide improvements to the manufacture of electrical machines.

It is a specific object of the present invention to provide improvements in the manufacture of core laminations used in an electrical machine.

It is a more particular object of the present invention to provide a device for use in the inspection of core laminations.

It is a specific object of the present invention to provide an inspection device that can be utilized during punch press set up and during production runs to determine core lamination quality.

It is also a specific object of the present invention to provide an inspection device that can facilitate set up of the punch press machine in which the wireway slots are formed.

It is also an object of the present invention to provide a device that facilitates visual inspection of a stack of core laminations.

It is a further object of the present invention to provide various methods for the inspection of core laminations.

Some of these objects are achieved by a device for inspecting a predetermined orientation of at least one inner diameter slot and at least one outer diameter slot defined in an annular lamination of the type utilized in an electrical machine. The device comprises a bed plate for receipt of the annular lamination thereon. The bed plate defines at least one guideway to align with the inner diameter slot and the outer diameter slot in the predetermined orientation. At least one first key, adapted to engage the inner diameter slot, is slidable along the guideway. At least one second key, adapted to engage the outer diameter slot, is also slidable along the guideway. As a result, the first key and the second key will engage only if the inner diameter slot and the outer diameter slot are correctly in the predetermined orientation.

In some exemplary embodiments, the at least one guideway defined by the bed plate comprises a single key channel extending longitudinally thereacross. In such embodiments, the annular lamination may define first and second outer diameter slots angularly separated by substantially 180 degrees. A plurality of inner diameter slots, each having a respective counterpart angularly separated therefrom by substantially 180 degrees, may also be defined in the annular lamination.

A pair of first keys may be provided, slidably engaging opposed of the inner diameter slots. Each second key may have an engaging portion generally complementary to the outer diameter slot into which it will be received. In some exemplary embodiments, each of the first keys may define a pointed engaging portion and each second key may define a generally rectangular engaging portion.

A plurality of post members may be provided in some embodiments, each adapted to be received in one of the inner diameter slots. In such embodiments, the bed plate preferably defines a plurality of recesses to receive respective of the post members. The recesses may be configured as respective grooves defined in the bed plate.

Other objects of the invention are achieved by a method for inspecting an annular lamination of the type utilized in an electrical machine. One step of the method involves providing a structure defining at least one key channel. The annular lamination is placed in relation to the structure such that the key channel is generally in alignment with at least one of an inner diameter slot and an outer diameter slot defined in the annular lamination. Next, a first key is moved into engagement with one of the inner diameter slot and the outer diameter slot. If the inner diameter slot and the outer diameter slot are radially aligned, a second key is moved into engagement with another of the inner diameter slot and the outer diameter slot. If the inner diameter slot and the outer diameter slot are not radially aligned, the second key is moved along the key channel into engagement with an outer diameter surface of the annular lamination.

Preferred methodology may utilize two (2) first keys moveable radially outward to engage diametrically opposed inner diameter slots. Similarly, two (2) second keys moveable radially inward may also be utilized.

In one application, a pair of annular laminations situated back-to-back with registered inner diameter slots may be placed in relation the structure. If the registered inner diameter slots are not radially aligned with the outer diameter slots of both annular laminations, an offset parameter may be measured indicative of an amount of offset from the predetermined orientation.

Other objects of the invention are achieved by a method for inspecting a stack of annular laminations of the type utilized in an electrical machine. One step of the method involves providing a plurality of post members adapted to be received in registered inner diameter slots of the stack of annular laminations. The post members are respectively placed into the registered inner diameter slots of the stack. The stack of annular laminations may then be inspected for alignment.

In some cases, the method may further include the step of providing a structure defining a plurality of recesses to receive respective of the post members. Preferably, the structure may be planar with the recesses being defined as respective grooves therein.

Other objects, features and aspects of the present invention are discussed in greater detail below.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying drawings, in which.

Repeat use of reference characters in the present specification and drawings is intended to represent same or analogous features or elements of the invention.

DETAILED DESCRIPTION OF PREFERRED EMBODIMENTS

It is to be understood by one of ordinary skill in the art that the present discussion is a description of exemplary embodiments only, and is not intended as limiting the broader aspects of the present invention, which broader aspects are embodied in the exemplary constructions.

Figure 1:
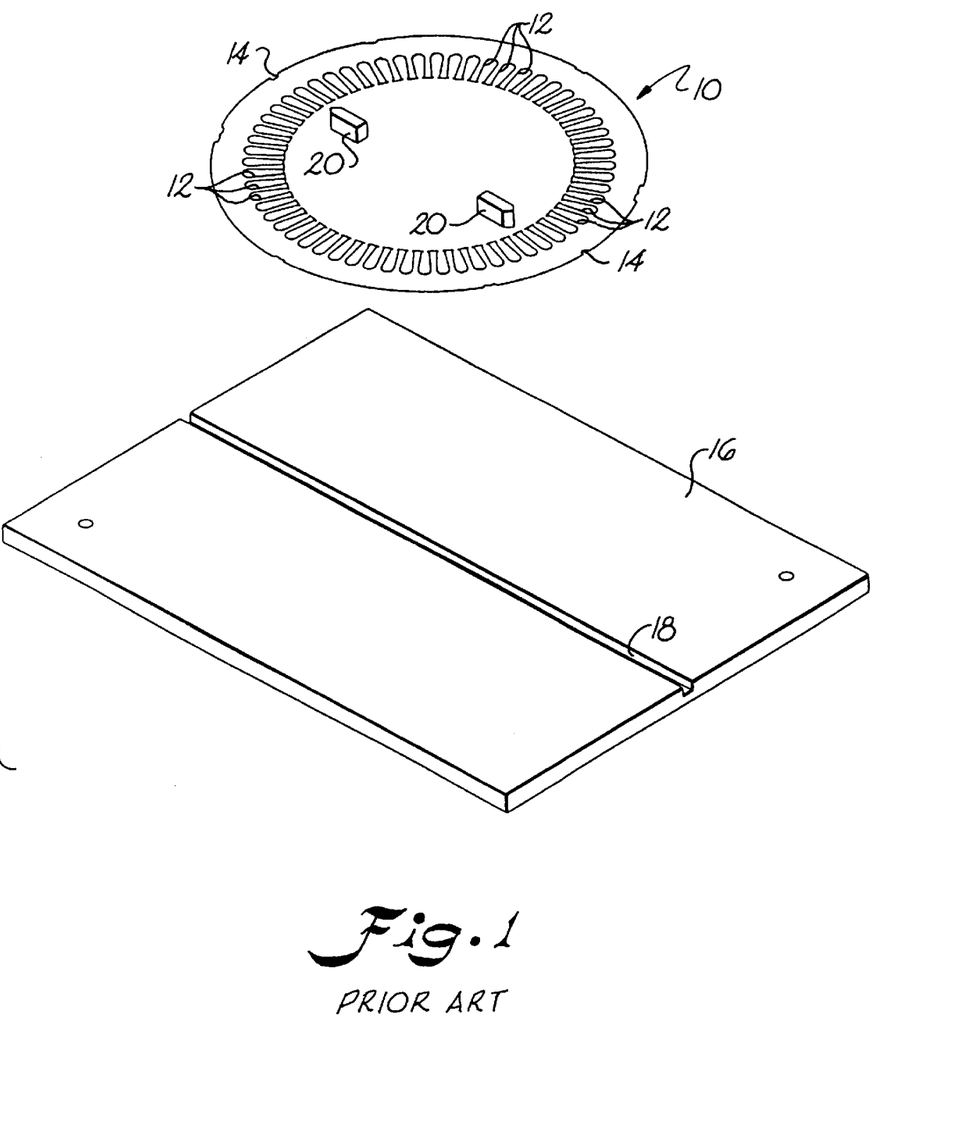
FIG. 1 is a perspective view with parts separated of a prior art device for inspection of core laminations.

Referring now to FIG. 1, a core lamination 10 is illustrated in conjunction with a prior art inspection device. As shown, core lamination 10 has a plurality of wireway slots 12 defined about its inner diameter. A pair of diametrically opposed timing slots 14 are likewise defined in the outer diameter of core lamination 10. As described above, slots 12 and slots 14 are preferably situated in a predetermined orientation with respect to one another. This predetermined orientation is fixed at the time the punch press machine that forms wireway slots 12 is set up.

A prior art device for inspecting core lamination 10 included a bed plate 16 defining a longitudinal key channel 18 thereacross. A pair of pointer keys 20 are provided for receipt in channel 18. In use, lamination 10 is placed onto the planar surface of bed plate 16. Keys 20 are received in groove 18 within the inner diameter of core lamination 10, oppositely directed as shown. One key 20 is then moved into engagement with a single wireway slot 12. The other key 20 is then moved into engagement with a diametrically opposed wireway slot 12.

It can be seen that this prior art device is generally useful in determining whether wireway slots 12 have been formed in the proper relationship to each other. The device does not determine, however, whether wireway slots 12 are in the predetermined orientation with respect to timing slots 14. As a result, iterative adjustments of the punch press machine used to produce wireway slots 12 may still be required. Such iterative adjustments take time, which reduces efficiency in the manufacturing environment. In addition, the device does not allow individual core laminations to be checked during production to determine that the punch press machine has not varied from its set-up parameters.

Figure 2:
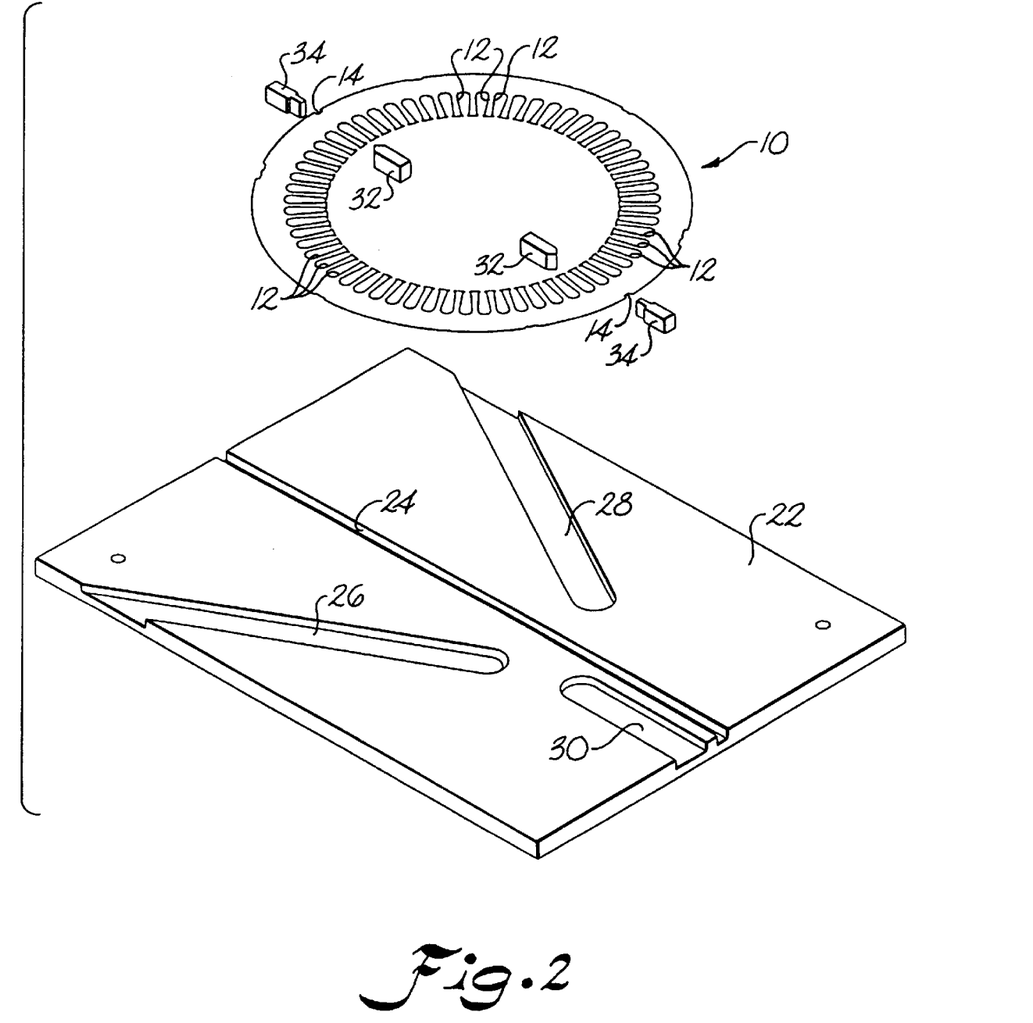
FIG. 2 is a view similar to FIG. 1 of a device for inspection of core laminations as constructed in accordance with the present invention.

FIG. 2 illustrates an inspection device constructed in accordance with the present invention. This inspection device includes a bed plate 22 defining therein a longitudinal key channel 24. In addition, bed plate 22 defines a pair of recesses 26 and 28 extending obliquely alongside key channel 24. A third recess 30 extends parallel to key channel 24, as shown. The inspection device further includes a pair of pointer keys 32. A pair of timing keys 34 are also provided.

Figure 2A:
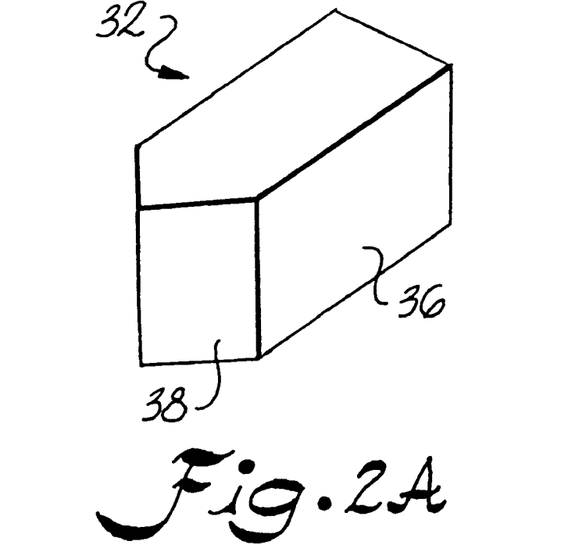
FIGS. 2A and 2B are perspective views respectively illustrating two types of keys used with the inspection device of FIG. 2.
Figure 2B:
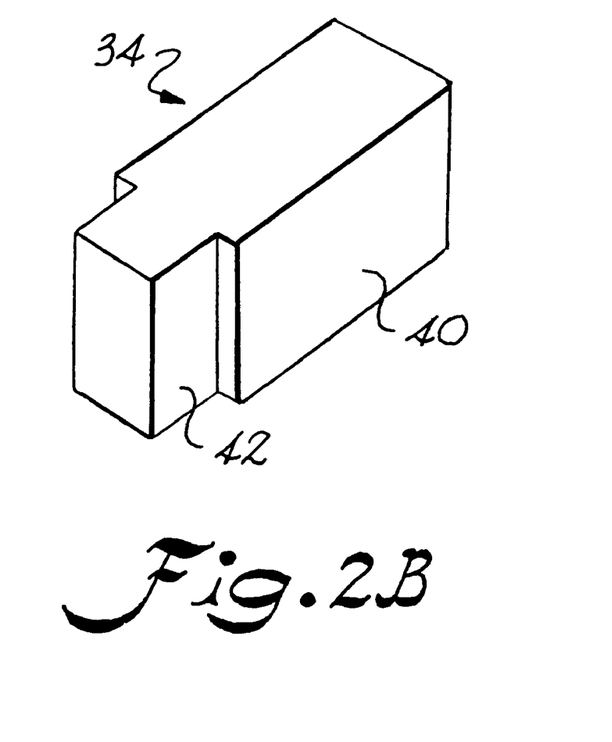

The construction of each pointer key 32 may be most easily explained with reference to FIG. 2A. As can be seen, pointer key 32 includes a main body portion 36 integrally extending into a pointed engaging portion 38. As shown in FIG. 2B, timing keys 34 each include a main body portion 40 integrally extending into a rectangular engaging portion 42. Engaging portion 42 is sized for snug fit in timing slot 14, whereas main body portions 36 and 40 are dimensioned for longitudinal slidable movement in key channel 24.

Figure 3:
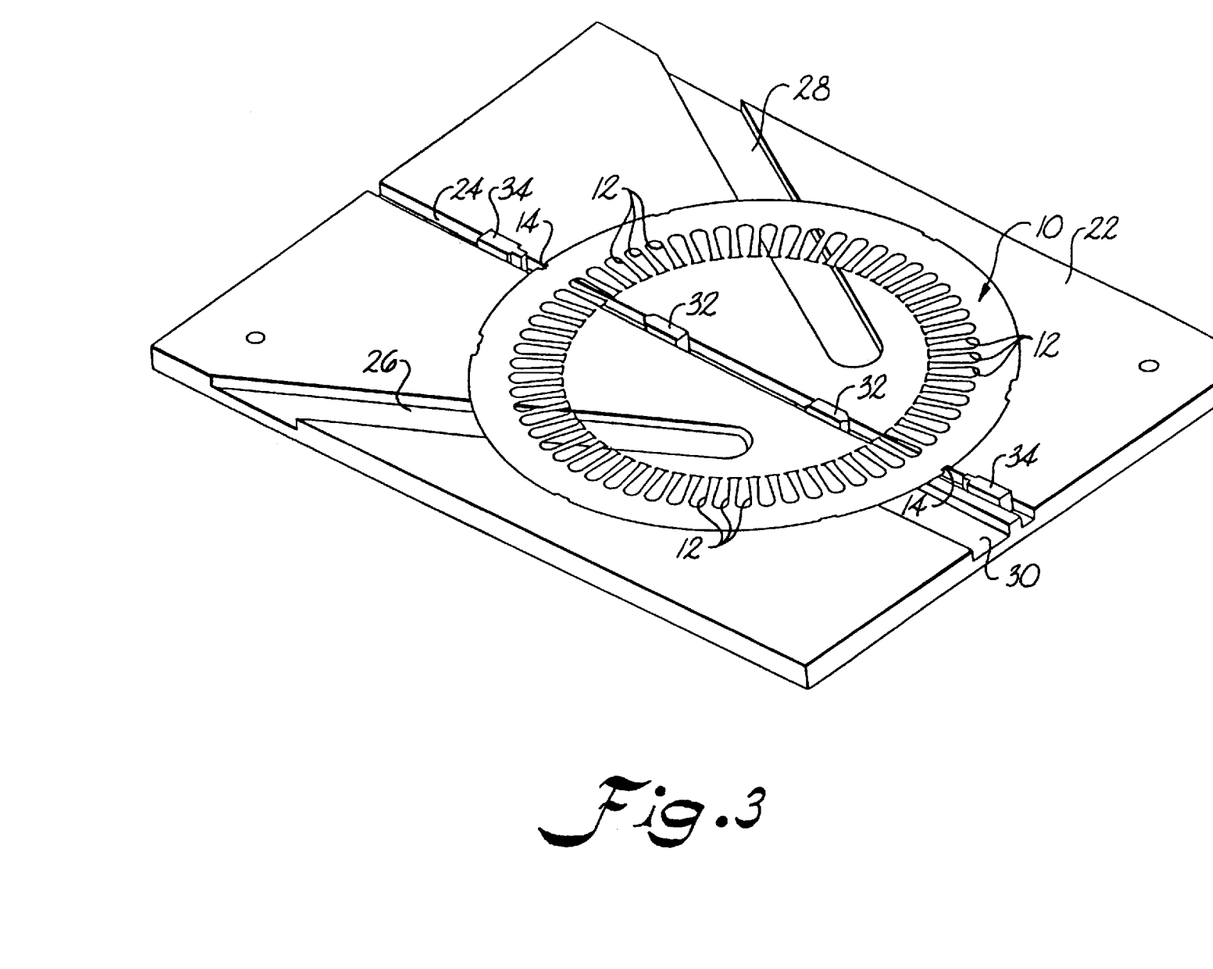
FIG. 3 is a perspective view of the device of FIG. 2 with pieces in position for use.

FIG. 3 illustrates pointer keys 32 and timing keys 34 in position for use within key channel 24. As can be seen, pointer keys 32 are located within the inner diameter of core lamination 10. Timing keys 34 are located outside of core lamination 10. In use, pointer keys 32 are moved into engagement with diametrically opposed winding slots 12. If the winding slots 12 and timing slots 14 are in the predetermined orientation, timing keys 34 are received in timing slots 14. If not, timing keys 34 will engage the outer diameter of the core lamination.

The manner in which pointer keys 32 and timing keys 34 cooperate to check the predetermined orientation between inner and outer diameter slots can be easily explained with reference to FIGS. 4A and 4B. In particular, FIGS. 4A and 4B show a single pointer key 32 engaging a winding slot 12.

Figure 4A:
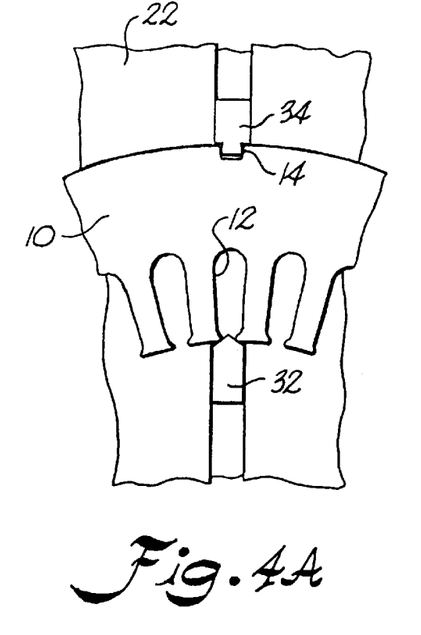
FIGS. 4A and 4B are enlarged plan views respectively showing correct and incorrect radial alignment between an inner diameter wireway slot and an outer diameter timing slot.
Figure 4B:
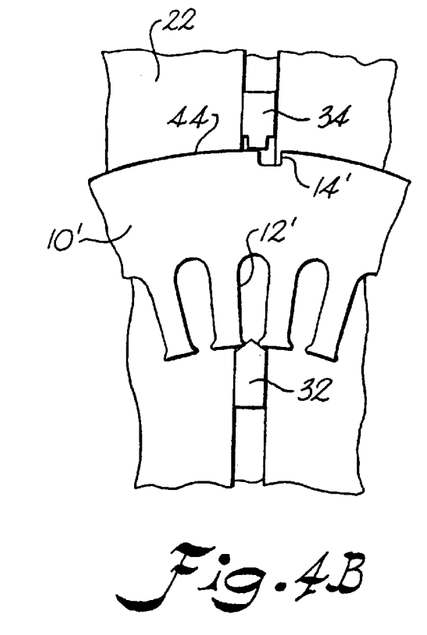

In FIG. 4A, the associated timing key 34 is fully received in timing slot 14. In other words, the slots of core lamination 10 are in the desired predetermined orientation. In contrast, the slot defined in core lamination 10' shown in FIG. 4B do not exhibit the predetermined orientation. This is easily confirmed through use of the inspection device, since timing key 34 is not received in timing slot 14'. Instead, timing key 34 engages the outer surface 44 of core lamination 10'.

Individual laminations can be randomly checked during operation of the punch press machine to confirm that the machine has not deviated from its set-up parameters. In addition, the device can be used to easily determine deviation from the desired parameters during set-up to eliminate the iterative trial and error techniques that have been used in the past. In other words, the device can be used to directly determine the amount by which the punch press machine deviates from the predetermined orientation, so that corrective action can be taken without multiple iterations.

Figure 5:
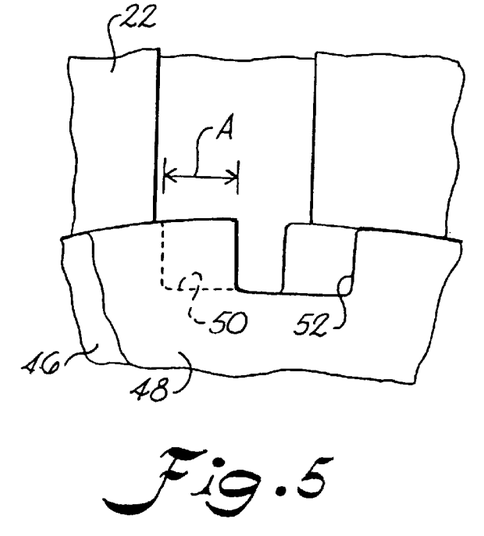
FIG. 5 is an enlarged plan view showing an offset parameter in back-to-back core laminations that can be readily measured when the device of FIG. 2 is utilized.

This use of the device is illustrated in FIG. 5, where a pair of core laminations 46 and 48 are placed on bed plate 22 in back-to-back relationship. In other words, core lamination 46 is flipped so that its top surface abuts the top surface of core lamination 48. If the predetermined orientation is achieved, respective timing slots 50 and 52 will be in register.

If the predetermined orientation has not been achieved, however, timing slots 50 and 52 will be out of register as shown. In this case, the amount of overlap, as shown by the arrow A, can be directly measured, for example, using calipers. The magnitude of this overlap is directly proportional to the deviation of the timing slots from the predetermined orientation. As such, the overlap value is directly indicative of the needed adjustment to the punch press machine. For example, a chart may be provided to the punch press operator correlating various overlap values with the corresponding adjustment to the machine.

Figure 6:
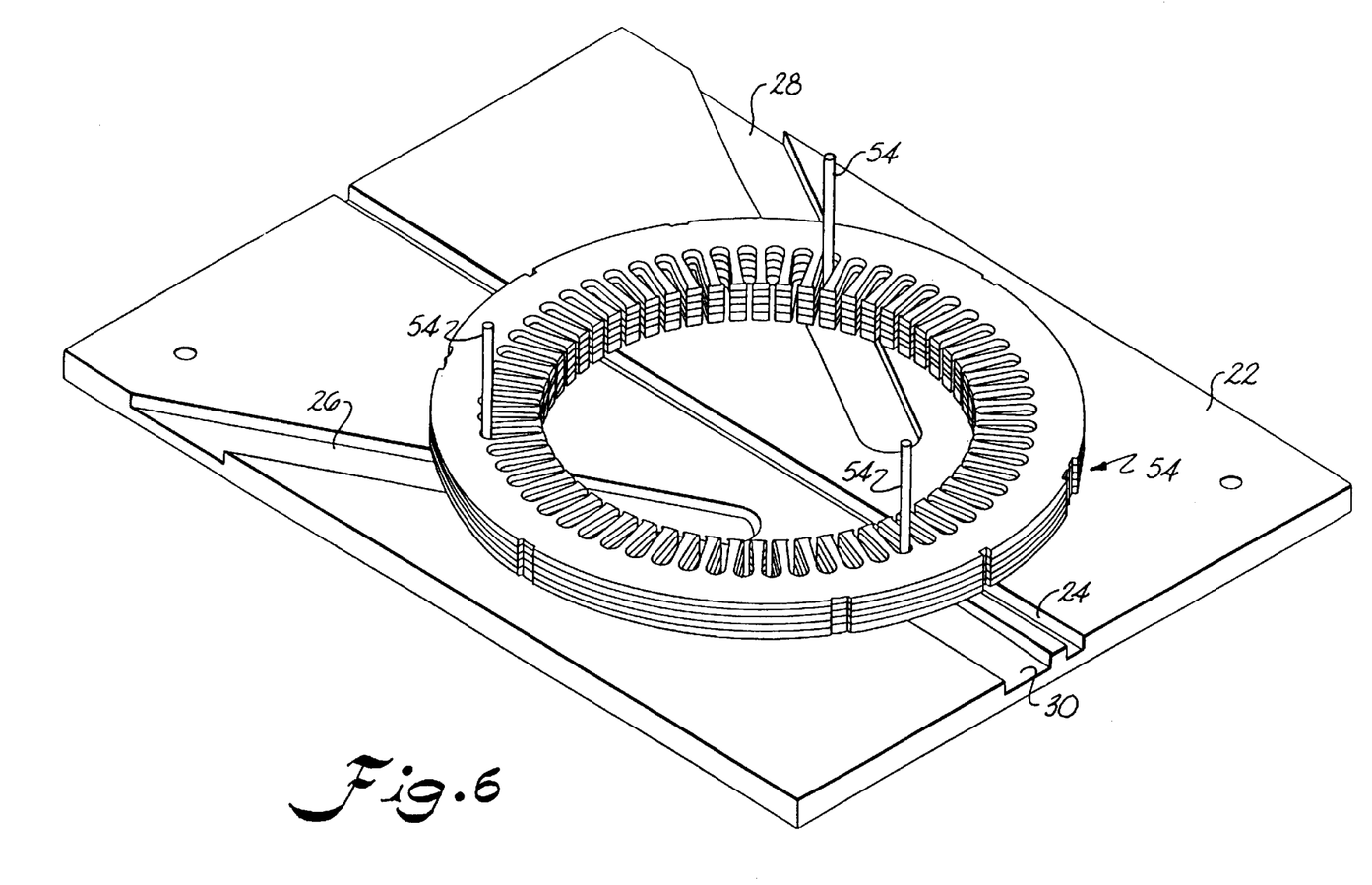
FIG. 6 is a perspective view showing an alternative use of the device of FIG. 2 to visually inspect a stack of core laminations.

FIG. 6 illustrates an alternative use of the inspection device to facilitate visual inspection of a stack 54 of core laminations. Typically, stack 54 may have a height of one inch or more. In this usage, a respective post member 54 is provided for each recess 26, 28 and 30. In particular, post members 54 are inserted through the channel defined by registered slots 12 into contact with the surface of the respective recess.

Preferably, the diameter of post member 54 is only slightly smaller than the inner diameter of the channel into which it will be inserted. As a result, insertion of post member 54 aligns the winding slots of respective laminations with one another. This may cause adjustment in stack 54, which allows any deviations in individual laminations to be easily recognized. In addition to slot orientation, such deviations may include the actual inner diameter and outer diameter values of the individual laminations.

While preferred embodiments of the invention and preferred methods of practicing same have been shown and described, modifications and variations may be made thereto by those of ordinary skill in the art without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only and is not intended to be limitative of the invention so further described in such appended claims.

What is claimed is:

1. A device for inspecting a predetermined orientation of a pair of diametrically opposed inner diameter slots from among a plurality of inner diameter slots defined on an inner diameter of an annular lamination utilized in an electrical machine in relation to first and second outer diameter slots defined on an outer diameter of said annular lamination, said device comprising:

a bed plate for receipt of said annular lamination thereon, said bed plate defining at least one guideway to align with said pair of diametrically opposed inner diameter slots and said first and second outer diameter slots in said predetermined orientation;

a pair of first keys slidable with respect to said guideway, each of said first keys adapted to engage a respective one of said pair of diametrically opposed inner diameter slots;

a pair of second keys slidable with respect to said guideway, each of said second keys adapted to engage a respective one of said first and second outer diameter slots; and whereby said first keys and said second keys will engage only if said pair of diametrically opposed inner diameter slots and said first and second outer diameter slots are correctly in said predetermined orientation.

2. A device as set forth in claim 1, wherein said at least one guideway defined by said bed plate comprises a single key channel extending longitudinally thereacross.

3. A device as set forth in claim 1, wherein said second keys have an engaging portion generally complementary to said outer diameter slots.

4. A device as set forth in claim 1, wherein said first keys define a pointed engaging portion and said second keys define a generally rectangular engaging portion.

5. A device for inspecting an annular lamination utilized in an electrical machine, said lamination having first and second outer diameter slots angularly separated by substantially 180 degrees, said lamination further having first and second inner diameter slots angularly separated by substantially 180 degrees and being from among a plurality of inner diameter slots, said device comprising:

a plurality of post members adapted to be received in respective inner diameter slots from among said plurality of inner diameter slots;

a bed plate for receipt of said annular lamination thereon, said bed plate defining a single key channel extending longitudinally thereacross to align with said first and second inner diameter slots and said first and second outer diameter slots when in a predetermined orientation;

at least one first key slidable with respect to said guideway, said first key adapted to engage one of said first and second inner diameter slots;

at least one second key slidable with respect to said guideway, said second key adapted to engage one of said first and second outer diameter slots; and whereby said first key and said second key will engage only if said one of said first and second inner diameter slots and said one of said first and second outer diameter slots are correctly in said predetermined orientation.

6. A device for inspecting an annular lamination utilized in an electrical machine, said lamination having first and second outer diameter slots angularly separated by substantially 180 degrees, said lamination further having first and second inner diameter slots angularly separated by substantially 180 degrees and being from among a plurality of inner diameter slots, said device comprising:

a plurality of post members adapted to be received in respective inner diameter slots from among said plurality of inner diameter slots;

a bed plate for receipt of said annular lamination thereon, said bed plate defining a single key channel extending longitudinally thereacross to align with said first and second inner diameter slots and said first and second outer diameter slots when in a predetermined orientation, said bed plate further defining a plurality of recesses to receive respective of said post members;

at least one first key slidable with respect to said guideway, said first key adapted to engage one of said first and second inner diameter slots;

at least one second key slidable with respect to said guideway, said second key adapted to engage one of said first and second outer diameter slots; and whereby said first key and said second key will engage only if said one of said first and second inner diameter slots and said one of said first and second outer diameter slots are correctly in said predetermined orientation.

7. A device as set forth in claim 6, wherein said recesses are respective grooves defined in said bed plate.

8. A method for inspecting annular laminations of the type utilized in an electrical machine, said method comprising steps of:

(a) providing a structure defining at least one key channel;

(b) placing in relation to said structure a pair of said annular laminations back-to-back with registered inner diameter slots such that said key channel is generally in alignment with diametrically opposed inner diameter slots of said pair;

(c) moving two first keys radially outward into respective engagement with one of said diametrically opposed inner diameter slots of said pair of said annular laminations;

(d) moving a second key along said key channel into engagement with outer diameter slots of said pair of said annular laminations if said outer diameter slots are in radial alignment with said diametrically opposed inner diameter slots;

(e) moving said second key along said key channel into engagement with an outer diameter surface of said pair of said annular laminations if said outer diameter slots are not in radial alignment with said diametrically opposed inner diameter slots; and (f) if said outer diameter slots are not in radial alignment with said diametrically opposed inner diameter slots of both of said pair of said annular laminations, measuring an offset parameter indicative of an amount of offset from radial alignment thereof.

9. A method as set forth in claim 8, wherein said first keys define a pointed engaging portion and said second key defines an engaging portion generally complementary to said outer diameter slot.

10. A method as set forth in claim 8, wherein steps (d) and (e) involve use of two second keys moved radially inward.

* * * * *